United States Patent
Kohno et al.

(10) Patent No.: US 6,862,930 B1
(45) Date of Patent: Mar. 8, 2005

(54) FLUID FLOW AMOUNT MEASURING APPARATUS RESPONSIVE TO FLUID FLOW IN FORWARD AND REVERSE DIRECTIONS

(75) Inventors: Yasushi Kohno, Nagoya (JP); Takao Ban, Toyohashi (JP)

(73) Assignee: Denso Corporation, Aichi (JP)

( * ) Notice: Subject to any disclaimer, the term of this patent is extended or adjusted under 35 U.S.C. 154(b) by 0 days.

(21) Appl. No.: 09/421,086

(22) Filed: Oct. 19, 1999

(30) Foreign Application Priority Data

Oct. 21, 1998 (JP) .......................................... 10-299353
Oct. 13, 1999 (JP) .......................................... 11-290517

(51) Int. Cl.[7] ................................................ G01F 1/68
(52) U.S. Cl. ................................................. 73/204.26
(58) Field of Search ........................ 73/204.23, 204.24, 73/204.26, 204.25

(56) References Cited

U.S. PATENT DOCUMENTS

| | | | |
|---|---|---|---|
| 4,399,698 A | * 8/1983 | Hiromasa et al. ............... 73/204 |
| 4,501,144 A | 2/1985 | Higashi et al. | |
| 4,669,301 A | 6/1987 | Kratt et al. | |
| 4,693,116 A | 9/1987 | Miura et al. | |
| 4,884,443 A | 12/1989 | Lee et al. | |
| 4,986,122 A | * 1/1991 | Gust ........................ 73/204.15 |
| 5,033,299 A | * 7/1991 | Tanaka et al. ............. 73/204.26 |
| 5,086,650 A | * 2/1992 | Harrington et al. ........ 73/204.21 |
| 5,369,994 A | 12/1994 | Hecht et al. | |
| 5,375,466 A | 12/1994 | Konzelmann | |
| 5,635,635 A | 6/1997 | Tsukada et al. | |
| 5,936,157 A | * 8/1999 | Yamashita et al. ......... 73/204.26 |
| 5,965,811 A | 10/1999 | Kawai et al. | |

FOREIGN PATENT DOCUMENTS

| | | |
|---|---|---|
| EP | 0285451 | 10/1988 |
| JP | 60-142268 | 7/1985 |
| JP | 61-213728 | 9/1986 |
| JP | A-62-14705 | 4/1987 |
| JP | 62-14705 | 4/1987 |
| JP | 1-185416 | 7/1989 |
| JP | 6-160142 | 6/1994 |
| JP | 6-265385 | 9/1994 |
| JP | 7-209054 | 8/1995 |
| JP | 7-286876 | 10/1995 |
| JP | 8-14978 | 1/1996 |
| JP | 10-62220 | 3/1998 |
| JP | 2000-193505 | 7/2000 |

OTHER PUBLICATIONS

U.S. patent appln. No. 09/994,051, filed Nov. 27, 2001 (copy of published application attached).

* cited by examiner

*Primary Examiner*—Harshad Patel
(74) *Attorney, Agent, or Firm*—Nixon & Vanderhye PC

(57) ABSTRACT

In a thermal-type air flow measuring apparatus, a heater is set to a reference temperature which is a predetermined temperature higher than an intake air temperature detector. A flow amount detector is disposed at an upstream side of the heater with respect to a forward direction of an intake air flow. The heater is turned at a plurality of points in a direction perpendicular to the forward direction of the intake air flow and has a predetermined width in the intake air flow direction so that heat transfers less in the intake air flow direction in the heater. If the intake air flow direction reverses, the temperature distribution in the heater also reverses. As a result, an intake air amount varying in response to the air flow direction is detected by comparing the temperature of the flow amount detector with the reference temperature.

51 Claims, 12 Drawing Sheets

FLUID FLOW AMOUNT MEASURING APPARATUS RESPONSIVE TO FLUID FLOW IN FORWARD AND REVERSE DIRECTIONS

CROSS REFERENCE TO RELATED APPLICATION

This application relates to and incorporates herein by reference Japanese Patent Applications No. 10-299353 filed on Oct. 21, 1998 and No. 11-290517 filed on Oct. 13, 1999.

BACKGROUND OF THE INVENTION

1. Field of the Invention

The present invention relates to a fluid flow measuring apparatus.

2. Related Art

A thermal-type flow meter is used as a flow measuring apparatus to measure the amount of intake air for an internal combustion engine of automotive vehicles or the like. In an engine of not more than four cylinders, intake air pulsation increases when it is in a low rotational speed and high load condition. If opening periods of an intake valve and an exhaust valve overlap when the intake air flow is pulsating, the intake air is likely to flow in a reverse direction through the intake valve when a piston moves upward. The air flowing in reverse also is detected as an additional intake air flow amount. As a result, the amount of intake air flow which is actually sucked into the combustion chamber cannot be detected accurately.

A flow meter disclosed in JP-B2-62-14705 measures intake air flow by correcting average flow based on engine operating condition parameters such as engine rotational speed and throttle opening, so that fluid flow may be measured as a function of the direction of fluid flow. However, intake air flow amount cannot be measured with high accuracy, because intake air pulsation accompanied by reverse flow cannot be simply determined from engine rotational speed and throttle opening.

A flow meter disclosed in JP-A-61-213728 determines that intake air flow direction is reversed when a plurality of singular points of a function appear in detected flow amount values. It is however difficult to accurately detect reversal of the intake air flow from detection of the singular points of a function, because pulsation in intake air flow is influenced largely by types of engines and intake air duct configurations.

A flow meter disclosed in JP-A-1-185416 detects intake air flow direction from a difference between detection signals of two heaters disposed at an upstream side and a downstream side of a planar substrate. However, control circuit construction is complicated, because two control circuits are required to detect signals from each heater. In addition, the temperature change rate of each heater at the time of heating operation may differ from each other, because it is difficult to match control constants of the two control circuits. Errors will occur in the difference between temperatures of the heaters, thus disabling an accurate detection of intake air flow direction.

Flow meters and flow speed sensors disclosed in JP-A-8-14978, JP-A-60-142268 and JP-A-6-160142 detect intake air flow direction from a difference between detection signals of two temperature sensors which are disposed at an upstream side and a downstream side of a heater. However, a sensing part including an intake air temperature sensor becomes large and the heat capacity of the sensing part increases, because the temperature sensors are disposed upstream and downstream of the heater. As a result, detection sensitivity and responsiveness of the flow meter will be lessened.

A flow meter disclosed in JP-A-10-62220 expands the measurable range and decreases the ratio of noise relative to an output signal by arranging a heater to surround a group of temperature measuring resistors and increasing the difference between the temperatures of temperature measuring resistors of the group disposed at an upstream side and a downstream side in the group with respect to fluid flow direction. However, a sensing part becomes large and the heat capacity of the sensing part increases, because the heater surrounds the group of the temperature measuring resistors. As a result, detection sensitivity and responsiveness of the flow meter will be lessened.

It is an object of the invention to provide a small-sized flow measuring apparatus which detects flow amount with high accuracy irrespective of fluid flow direction.

According to a preferred embodiment of the present invention, a heater is strip-shaped in a manner that each strip turns at a plurality of points and has a width in a flow direction. The temperature of the heater is controlled to a reference temperature determined in correspondence with a temperature detected by a fluid temperature detector. A flow amount detector is disposed at only one of an upstream side and a downstream side of the heater with respect to one fluid flow direction, so that fluid flow amount varying with fluid flow direction is detected from the temperature detected by the flow amount detector.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1A:
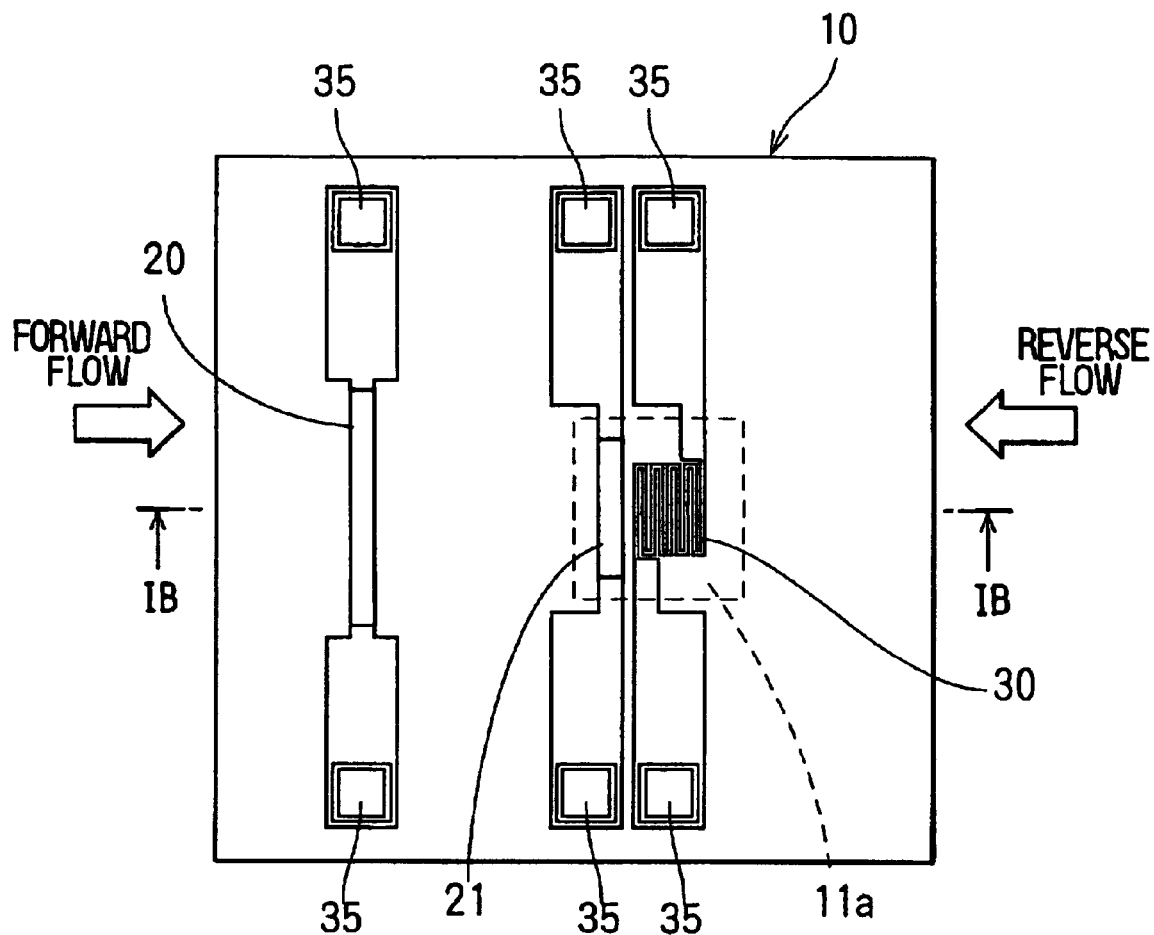
FIG. 1A is a plan view showing a flow amount measuring apparatus according to a first embodiment of the present invention.

The present invention will be described with reference to various embodiments which are applied to an intake air amount measuring apparatus for internal combustion engines. The same reference numerals designate the same construction.

(First Embodiment)

Figure 1B:
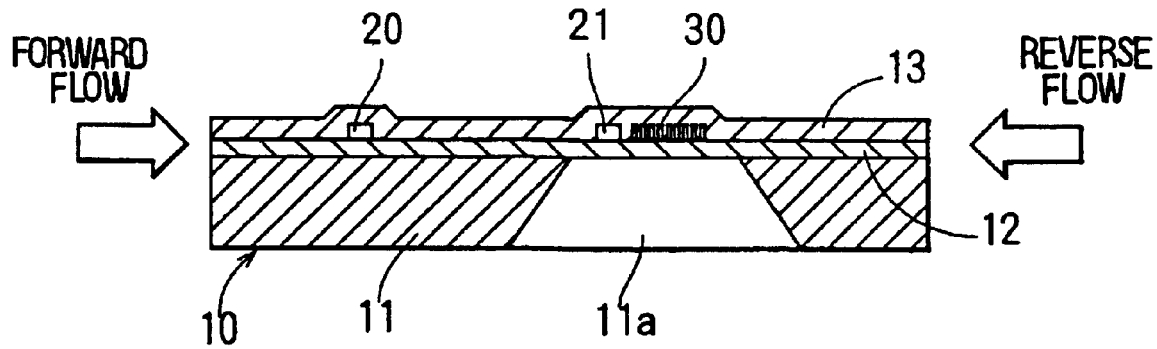
FIG. 1B is a sectional view showing the flow amount measuring apparatus along line IB–IB in FIG. 1A.

Referring to FIGS. 1A and 1B, a flow amount detecting unit is disposed in an engine intake duct (not shown). The flow amount detecting unit 10 comprises a semiconductor substrate 11 made of a silicon or the like. A cavity 11a is formed in the semiconductor 1 at a location where a flow amount detector 21 and a heater 30 are formed. An insulating film 12 covers a top surface of the semiconductor substrate 11 including the cavity 11a. The cavity 11a is formed by an anisotropic etching from a bottom surface higher than that detected by the intake air temperature detector 20.

Figure 2:
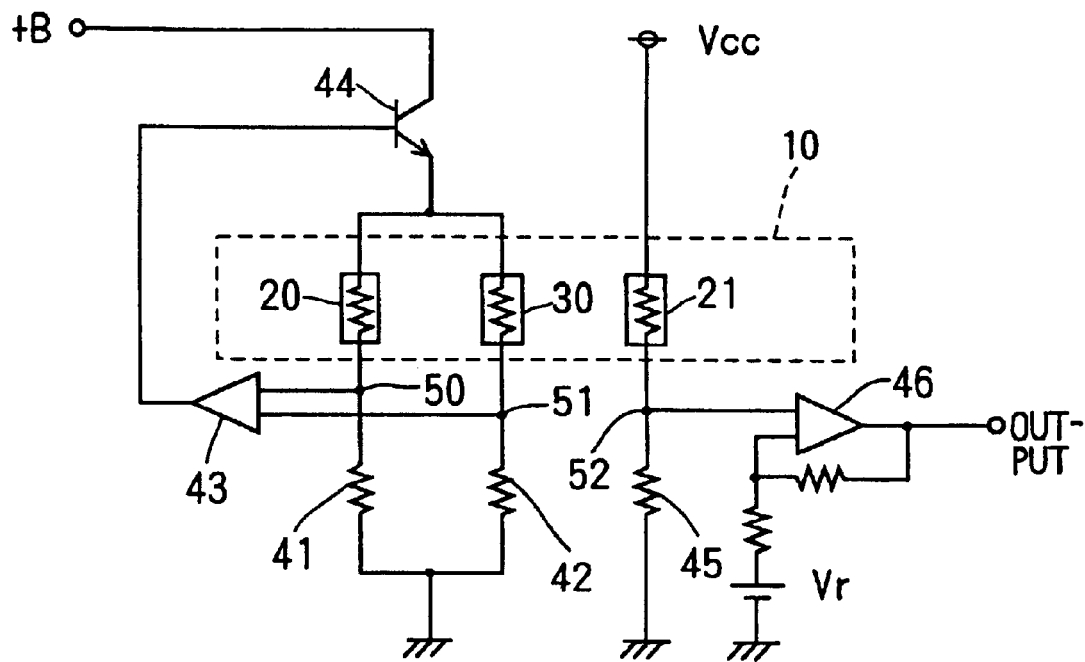
FIG. 2 is a circuit diagram showing an equivalent circuit of the flow amount measuring apparatus according to the first embodiment.

In FIG. 2, a circuit which includes the flow amount detector 21, a resistor 45 having a fixed resistance, an amplifier 46 and the like is for outputting an amplified potential which varies with a ratio of resistances of the flow amount detector 21 and the resistor 45. As the flow amount detector 21 changes its temperature and hence its resistance in accordance with an intake air flow amount and an intake air flow direction, the output of the amplifier 46 responsively changes.

Figure 3:
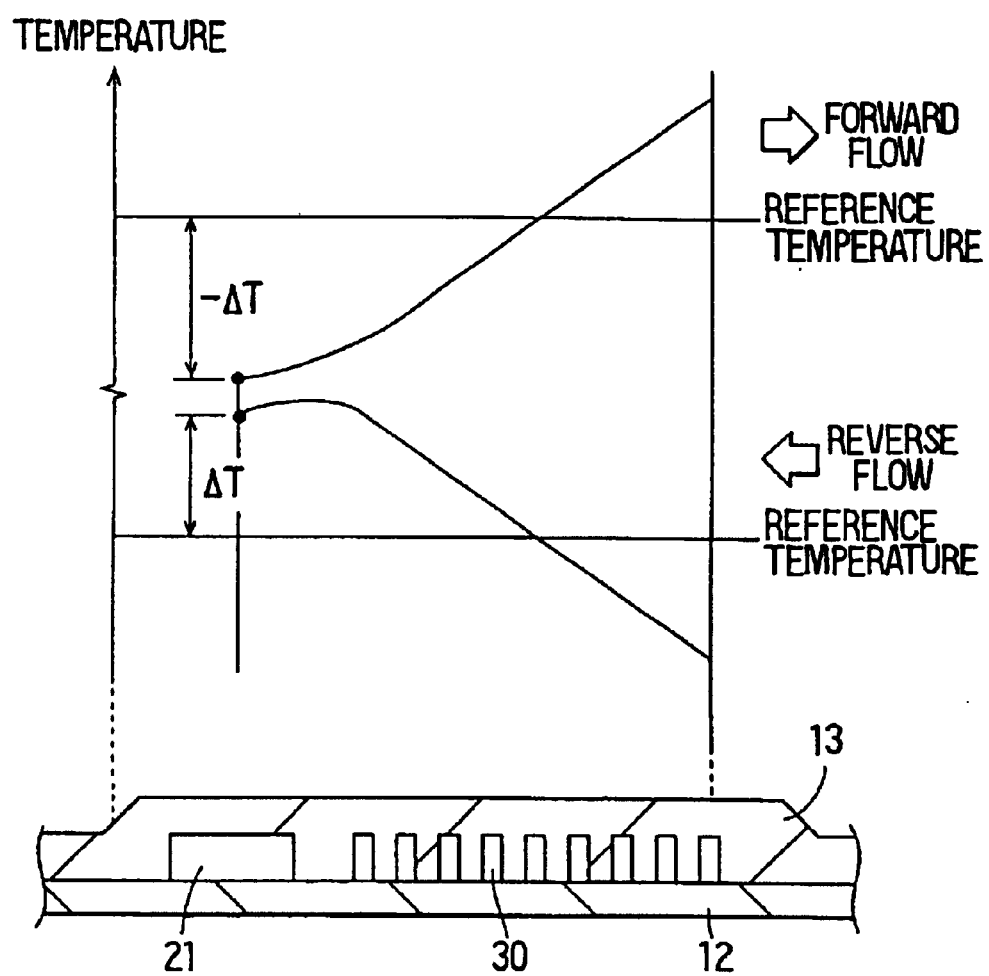
FIG. 3 is a graph showing a temperature distribution in the cases of an air flow in a forward direction and a reverse direction in the first embodiment.

A relation among a temperature distribution in the heater 30, a detection temperature of the flow amount detector 21 and the reference temperature are shown in FIG. 3. The temperature in the heater 30 at the upstream side of the intake air flow decreases below the reference temperature, because the intake air flow in the forward direction cools the upstream side of the heater more than the downstream side. The total resistance of the heater 30 lowers, because the resistance at the upstream side decreases when the temperature of the upstream side lowers. The electrical current supplied to the heater 30 increases to raise the decreased total resistance, and the temperature at the downstream side of the intake air flow rises above the reference temperature. The total resistance of the heater 30 increases, because the resistance at the downstream side increases with the increase in the temperature at the downstream side. The temperature at the upstream side of the heater 30 is still maintained below the reference temperature, because the intake side of the semiconductor substrate 11 to a boundary surface with the insulating film 12. An intake air temperature detector 20, flow amount detector 21 and heater 30 are formed in this order on the insulating film 12 from the upstream side (left side in the figures) in a forward direction in which the intake air normally flows to be sucked into combustion chambers (not shown). The intake air temperature detector 20 as a fluid temperature detector is a resistor which changes its resistance in response to the intake air temperature thereby detecting the temperature of the intake air flowing therethrough. The heater 30 is a heat-generating type resistor and is controlled, by a bridge circuit shown in FIG. 2, to a reference temperature which is a predetermined temperature higher than that of the intake air temperature detected by the intake air temperature detector 20. The intake air temperature detector 20 is disposed at an upstream position away from the heater 30 so that the heat of the heater 30 does not influence the temperature detection operation of the intake air temperature detector 20. The flow amount detector 21 is a resistor and disposed at the upstream side of the heater 30 with respect to the forward direction of the intake air flow. The flow amount detector 21 also changes its resistance to detect the intake air flow amount passing therethrough.

As shown in FIG. 1A, the heater 30 is a thin strip type and turns at a plurality of locations in a manner that each strip cross perpendicularly to the intake air flow direction. It has a predetermined width in the intake air flow direction. Terminals 35 are provided to electrically connect the intake air temperature detector 20, the flow amount detector 21 and the heater 30 with an external electrical circuit. The intake air temperature detector 20, the flow amount detector 21 and the heater 30 are covered with an insulating film 13.

The flow amount detecting unit 10 shown in FIG. 1 is connected to an external electrical circuit as shown in FIG. 2. The intake air temperature detector 20 and the heater 30 form a bridge circuit with resistors 41 and 42 of fixed resistances. The resistance of each resistor of the bridge circuit is determined so that the temperature of the heater 30 is maintained at a reference temperature which is predetermined temperature higher than that detected by the intake air temperature detector 20. The reference temperature increases and decreases in accordance with the intake air temperature detected by the intake air temperature detector 20.

When the temperature of the heater 30 becomes lower than the reference temperature and its resistance decreases, a potential difference appears between junctions 50 and 51 in the bridge circuit. A comparator 43 produces a high level output to turn on a transistor 44 and supply an electrical current to the heater 30 so that the temperature of the heater 30 rises. When the temperature of the heater 30 reaches the reference temperature and its resistance increases, the transistor 44 turns off in response to a low level output of the comparator 43 to interrupt the electrical current supplied to the heater 30. The temperature of the heater 30 is set, by the bridge circuit as constructed above, to the reference temperature which is predetermined temperature air flow continues to cool the upstream side. The heat transfer path along which the heat is transferred from the downstream side to the upstream side of the intake air flow in the heater 30 is long, and the heat is not transferred quickly from the downstream side to the upstream side of the intake air flow. As a result, the temperatures at the upstream side and the downstream side of the intake air flow in the heater 30 continues to be lower and higher than the reference temperature, respectively.

The flow amount detector 21 is located close to the upstream side of the intake air flow of the heater 30 with respect to the forward direction of the intake air flow so that the temperature detected by the flow amount detector 21 becomes substantially equal to the temperature of the upstream side of the heater 30. That is, the detection temperature of the flow amount detector 21 is lower and higher than the reference temperature when the intake air flows in the forward direction and in the reverse direction, respectively. The larger difference between the detection temperature of the flow amount detector 21 and the reference temperature means the larger intake air flow amount irrespective of the intake air flow direction. Changes in the detection temperature of the flow amount detector 21 with respect to the intake air flow direction and the intake air flow amount are shown in FIG. 4.

Figure 4:
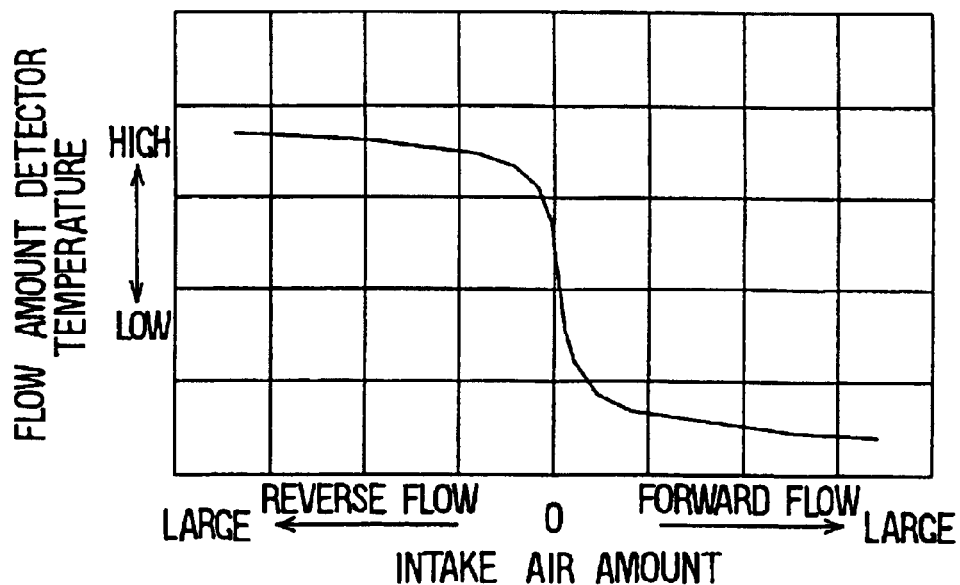
FIG. 4 is a characteristic graph showing a relation between the air flow and a flow amount-detector in the case of the air flow in the forward direction and the reverse direction in the first embodiment.

Here, the characteristics of FIG. 4 showing changes in the detection temperature of the flow amount detector 21 changes with the intake air temperature, because the reference temperature changes with the detection temperature of the intake air temperature detector 20, that is, the intake air temperature. The control circuit shown in FIG. 2 thus detects the intake air flow amount while responding to the intake air flow direction under the condition that the intake air temperature does not change. Even under the condition that the intake air temperature changes, the intake air flow amount responsive to the intake air flow direction can be measured by, for instance, varying the other input potential of the amplifier 46, to which the potential of a junction 52 is applied, in response to the detection temperature of the intake air temperature detector 20 or the reference temperature of the heater 30. That is, the intake air flow amount can be measured irrespective of changes in the intake air temperature by comparing the temperature detected by the flow amount detector 21 with the detection temperature of the intake air temperature detector 20 or the reference temperature of the heater 30. Because the reference temperature is set to be predetermined temperature higher than the detection temperature of the intake air temperature detector 20, the intake air flow amount responsive to the intake air flow direction can be measured by comparing either one of the temperatures with the detection temperature of the flow amount detector 21. It is also possible to measure the intake air flow amount by applying the potential signals of the junctions 50 and 52 to an ECU and retrieving a map data in the ECU.

Figure 5A:
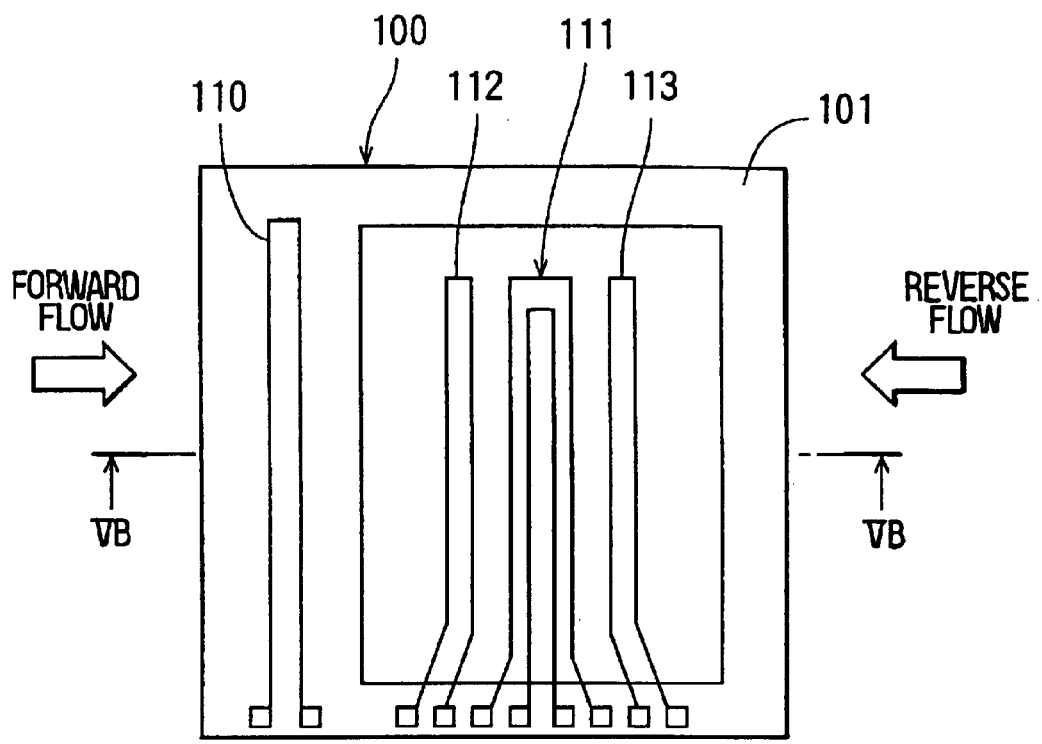
FIG. 5A is a plan view showing a flow amount measuring apparatus according to a comparative example.
Figure 5B:
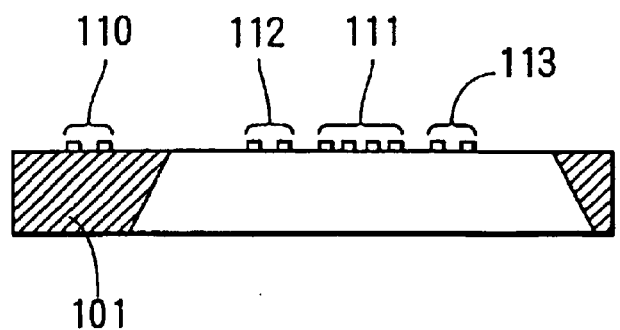
FIG. 5B is a sectional view showing the flow amount measuring apparatus along line VB—VB in FIG. 5A.

Here, a flow amount meter unit in which flow amount detector are disposed upstream and downstream a heater is described for comparison with the first embodiment. As shown in FIGS. 5A and 5B, in a unit 100, an intake air temperature detector 110, a flow amount detector 112, a heater 111 and a flow amount detector 113 are disposed on a substrate 101 from the upstream side in the forward direction of intake air flow. The temperature of the heater 111 is controlled to be a predetermined temperature higher than that detected by the intake air temperature detector 110.

Figure 6:
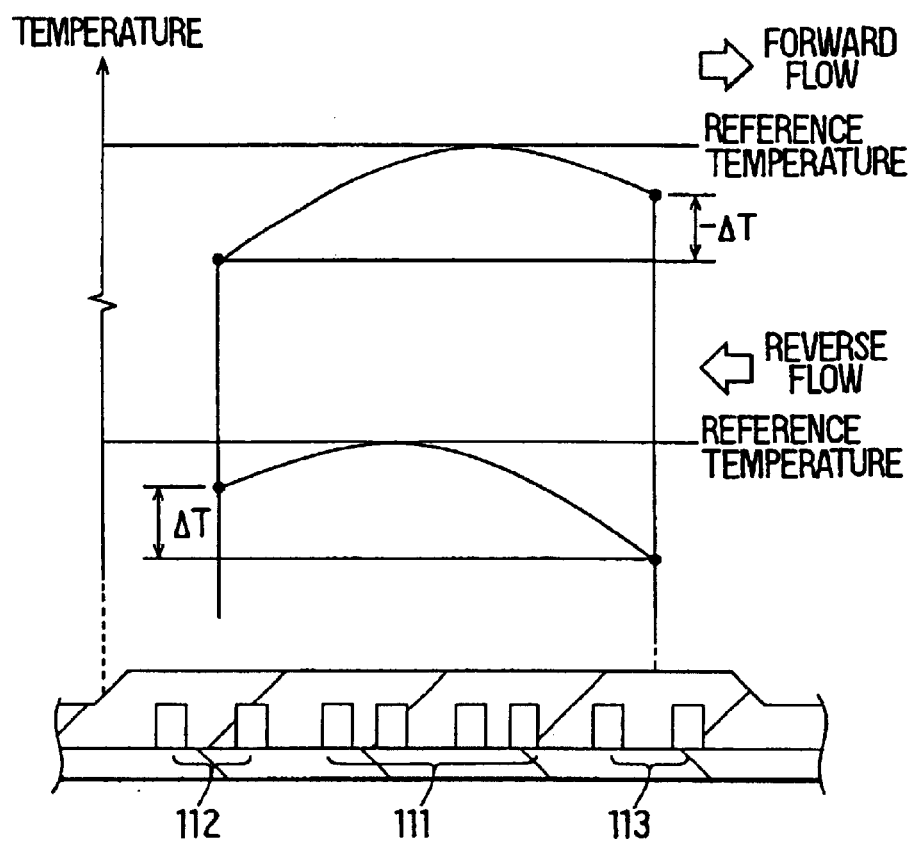
FIG. 6 is a graph showing a temperature distribution in the cases of an air flow in a forward direction and a reverse direction in the comparative example.

As shown in FIG. 6, as long as the intake air flows in the forward direction, the detection temperature of the flow amount detector 112 located upstream the heater 111 is lower than the detection temperature of the flow amount detector 113 located downstream the heater 111. Further, as long as the intake air flows in the reverse direction, the detection temperature of the flow amount detector 113 located upstream the heater 111 in the reverse direction is lower than the detection temperature of the flow amount detector 112 located downstream the heater 111. The heater 111 turns only at one point and its width in the intake air flow direction is narrow. As a result, there occurs substantially no difference in temperatures in the intake air flow direction and the temperature is set uniformly over the entire area. Therefore, the detection temperature of the flow amount detectors 112 and 113 are slightly lower than the reference temperature set in the heater 111, because of being cooled by the intake air flow.

Figure 7:
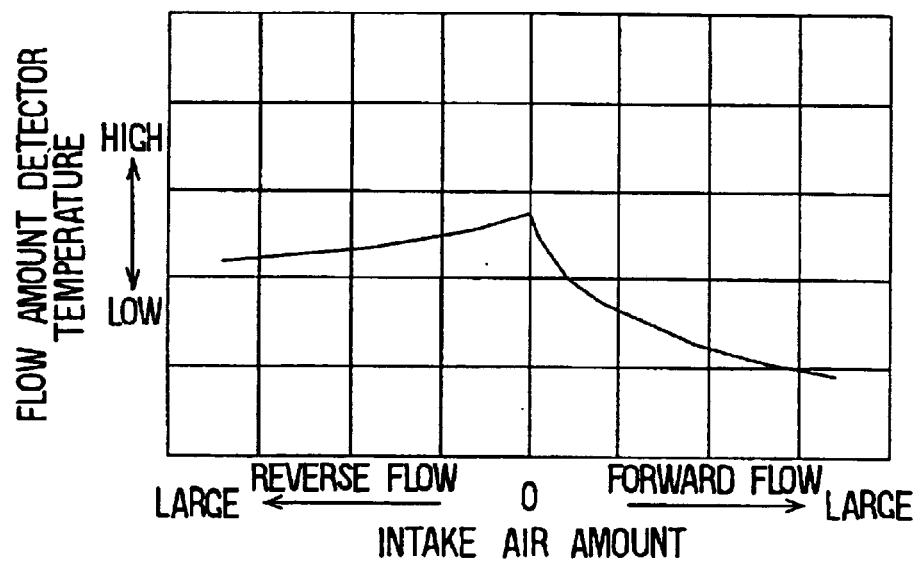
FIG. 7 is a characteristic diagram showing a relation between the air flow and a flow amount detector in the case of the air flow in the forward direction and the reverse direction in the comparative example.

The relation of the detection temperature of the flow amount detector 112 relative to the intake air flow direction and the intake air flow amount is shown in FIG. 7. The detection temperature indicates the temperature of the flow amount detector 112 and the flow amount detector 113 when the intake air flows in the forward direction and in the reverse direction, respectively. As understood from FIG. 7, the difference between the temperatures detected by the flow amount detectors is small, because the heater 111 has no substantial temperature difference in the intake air flow direction. Therefore, the intake air flow amount cannot be measured with high accuracy when the intake air flow amount is small. Further, the detecting unit must be sized large to dispose the flow amount detectors 112 and 113 at the upstream side and the downstream side of the heater 111, respectively. As a result, the heat capacity of the unit 100 becomes large, and the detection sensitivity and the responsiveness become low.

According to the first embodiment, however, the heater 30 turns at plural points to cross in a direction perpendicular to the intake air flow and has the predetermined width in the intake air flow direction so that the length of the heat transfer path is extended in the intake air flow direction. As a result, the temperature at the upstream side in the heater 30 in the air flow direction becomes lower than the reference temperature because of cooling by the intake air flow. The temperature at the downstream side in the heater 30 in the air flow direction is increased above the reference temperature to maintain the reference temperature. This condition is maintained. The flow amount detecting unit 10 is thus sized small and its heat capacity is decreased, because the intake air flow amount and the intake air flow direction are detected by comparing the detection temperature of the flow amount detector 21 and the reference temperature. In addition, because the difference between the detection temperature of the flow amount detector 21 and the reference temperature is made large, the intake air flow amount and the intake air flow direction are detected with high sensitivity and responsiveness even when changes in the temperature and the flow amount are small.

(Second Embodiment)

Figure 8:
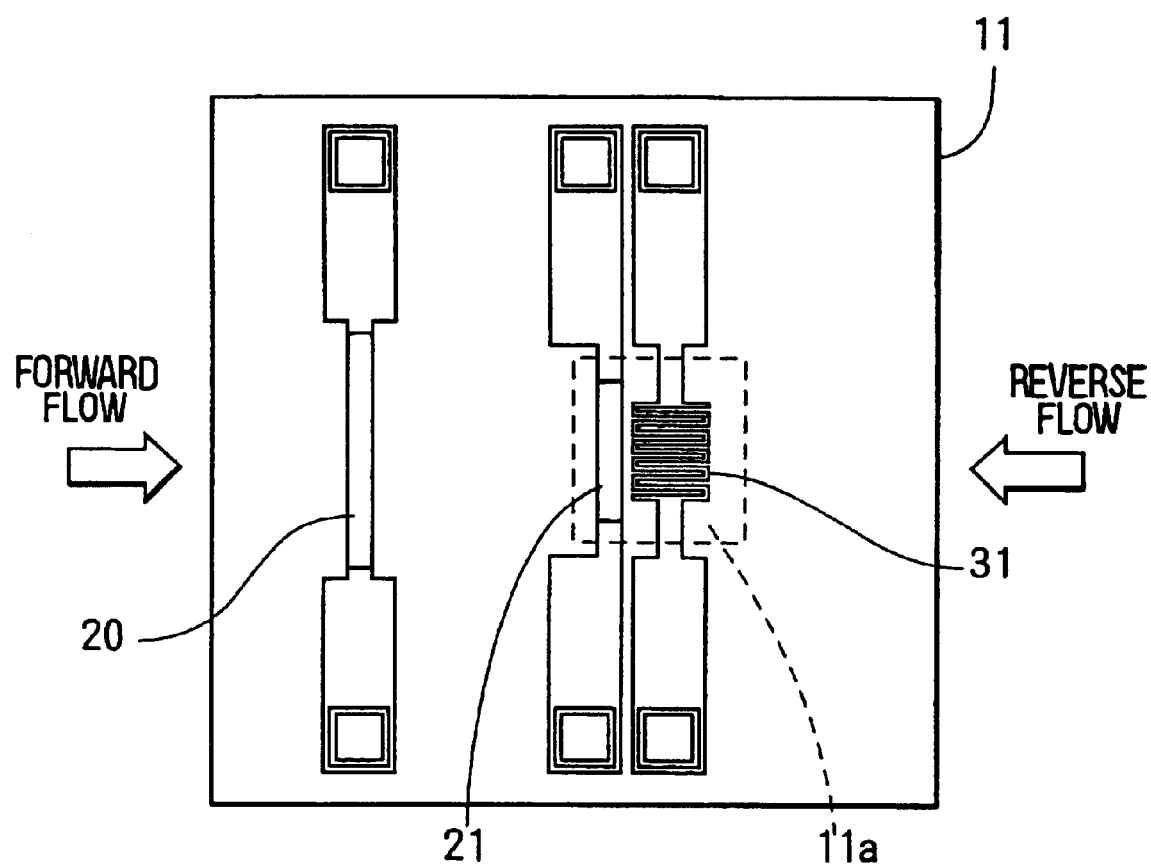
FIG. 8 is a plan view showing a flow amount measuring is apparatus according to a second embodiment of the present invention.

In a second embodiment shown in FIG. 8, a strip of heater 31 is turned at a plurality of points so that each strip extends in the intake air flow direction. In this heater 31, the temperatures at the upstream side and the downstream side of the intake air flow in the heater 31 become lower and higher than the reference temperature, respectively. Therefore, the intake air flow amount responsive to the intake air flow direction are detected by detecting the temperature by the flow amount detector 21.

(Third Embodiment)

In a third embodiment, the intake air temperature detector 20 is arranged so that the heat of the heater 30 does not influence the temperature detection operation. It may however occur that the temperature of the semiconductor substrate 11 and the intake air temperature under some engine operating conditions such as a dead soak, hot soak or the like condition. If the semiconductor substrate 11 is solid at a position underneath the intake air temperature detector 20, the temperature of the semiconductor substrate 11 influences the intake air temperature detector 20, thus disabling an accurate detection of the intake air temperature.

Figure 9A:
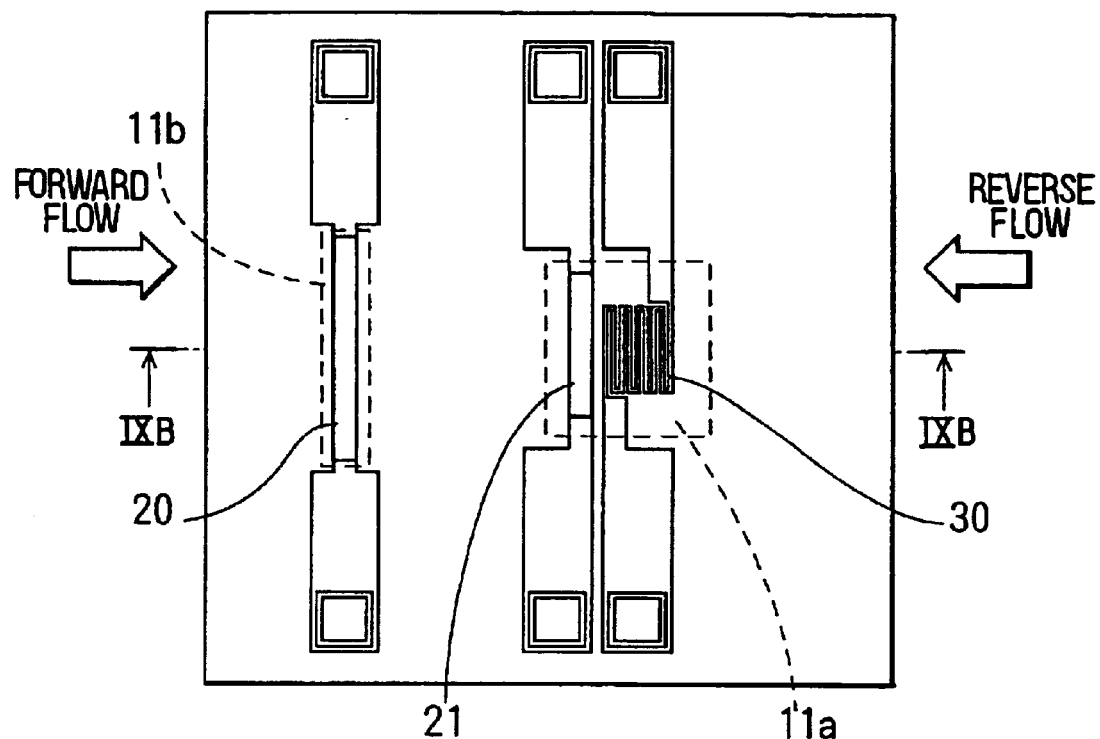
FIG. 9A is a plan view showing a flow amount measuring apparatus according to a third embodiment of the present invention.
Figure 9B:
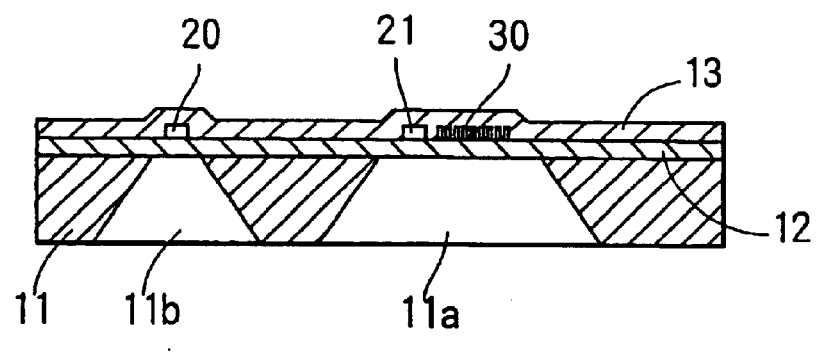
FIG. 9B is a sectional view showing the flow amount measuring apparatus taken along line IXB—IXB in FIG. 9A.

For this reason, as shown in FIGS. 9A and 9B, a cavity 11b is formed in the semiconductor substrate 11 at the position underneath the intake air temperature sensor 20 so that the intake air temperature detector 20 is less influenced by the heat of the semiconductor substrate 11 and is enabled to detect the intake air temperature accurately.

(Fourth Embodiment)

Figure 10A:
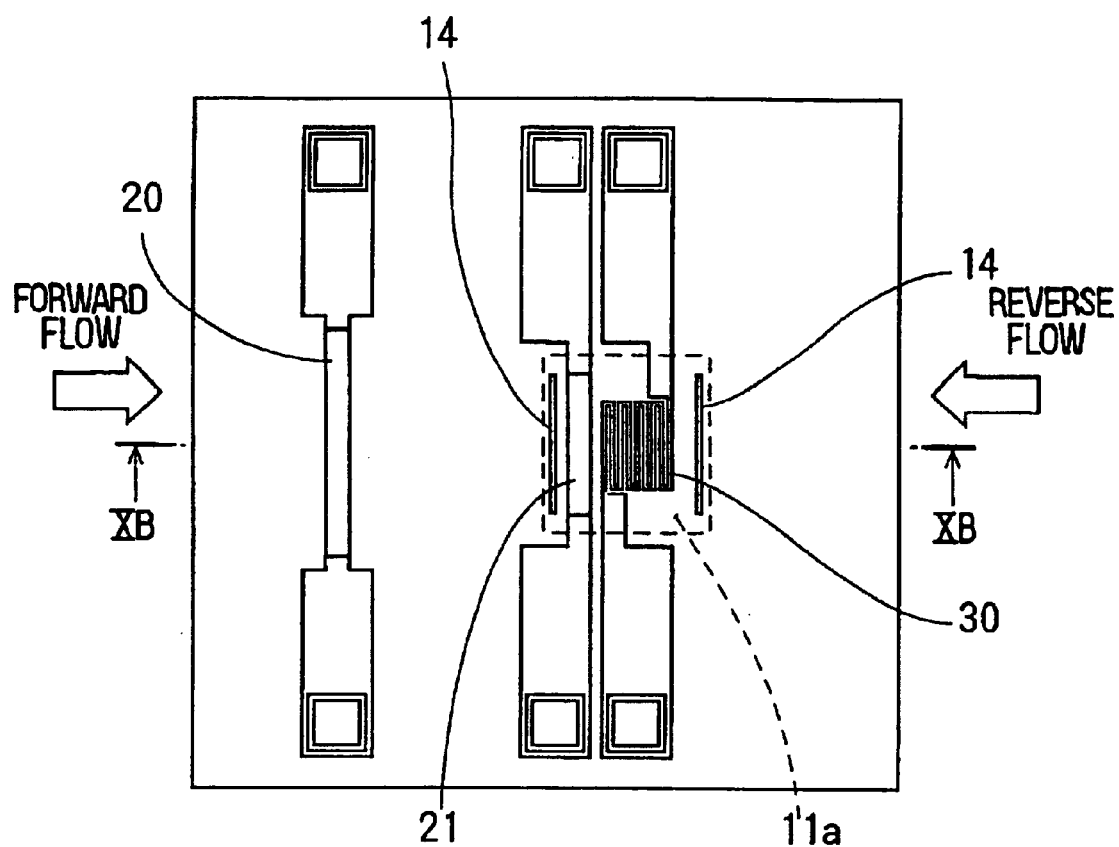
FIG. 10A is a plan view showing a flow amount measuring apparatus according to a fourth embodiment of the present invention.
Figure 10B:
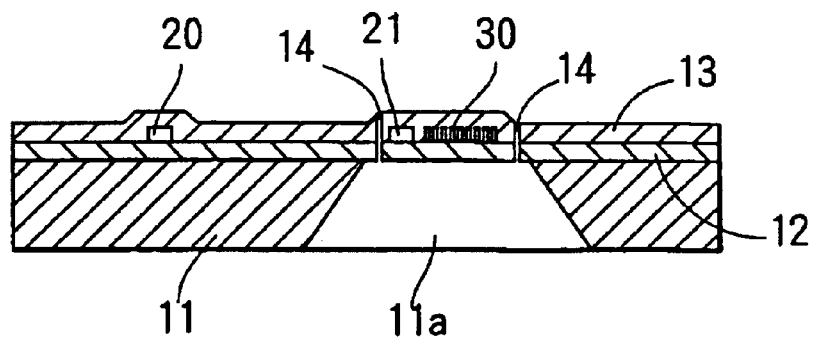
FIG. 10B is a sectional view showing the flow amount measuring apparatus along line XB—XB in FIG. 10A.

In a fourth embodiment shown in FIGS. 10A and 10B, a pair of slits 14 are formed in the insulating films 12 and 13 in such a manner that the flow amount detector 21 and the heater 30 are interposed therebetween in the intake air flow direction. The slits 14 restrict the heat of the heater 30 from being transferred to the semiconductor substrate 11. As a result, the electricals power required for the heater 30 to generate heat is reduced.

(Fifth Embodiment)

Figure 11:
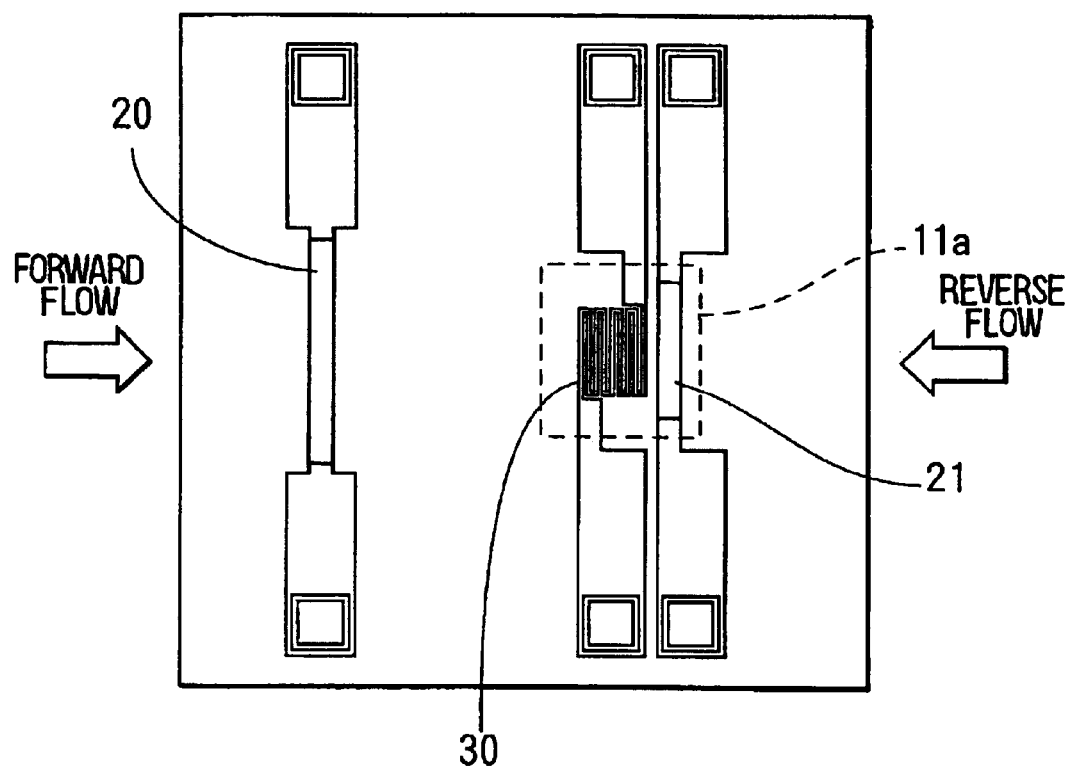
FIG. 11 is a plan view showing a flow amount measuring apparatus according to a fifth embodiment of the present invention.

In a fifth embodiment shown in FIG. 11, the flow amount detector 21 is disposed at the downstream side of the heater 30 with respect to the forward direction of the intake air flow. The relation between the reference temperature and the detection temperature of the flow amount detector 21 does not depend on whether the intake air flow direction is forward or reverse, but depends on whether the flow amount detector 21 is located at the upstream side or the downstream side of the intake air flow. Therefore, the intake air amount is measured even if the flow amount detector 21 is disposed at the downstream side of the heater 30 with respect to the forward direction of the intake air flow.

(Sixth Embodiment)

Figure 12A:
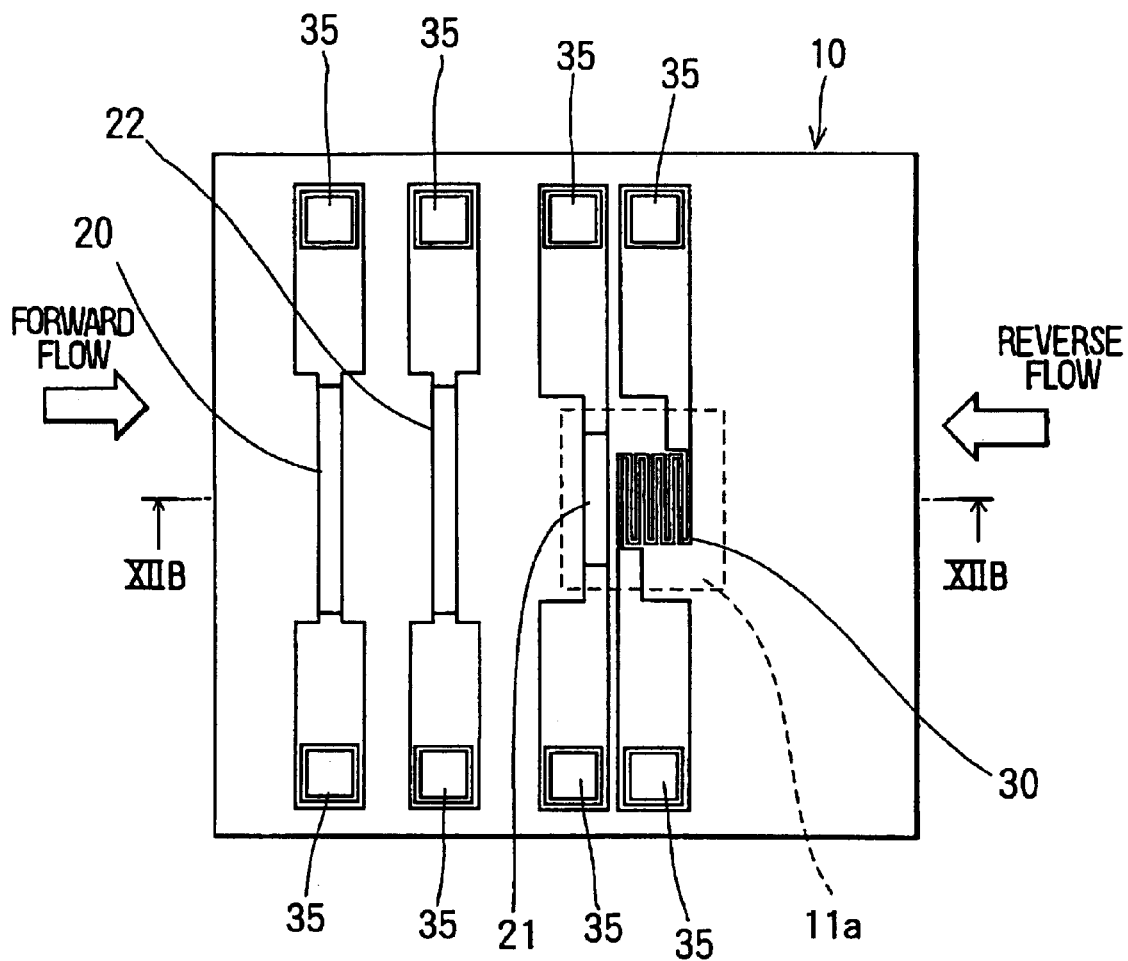
FIG. 12A is a plan view showing a flow amount measuring apparatus according to a sixth embodiment of the present invention.
Figure 12B:
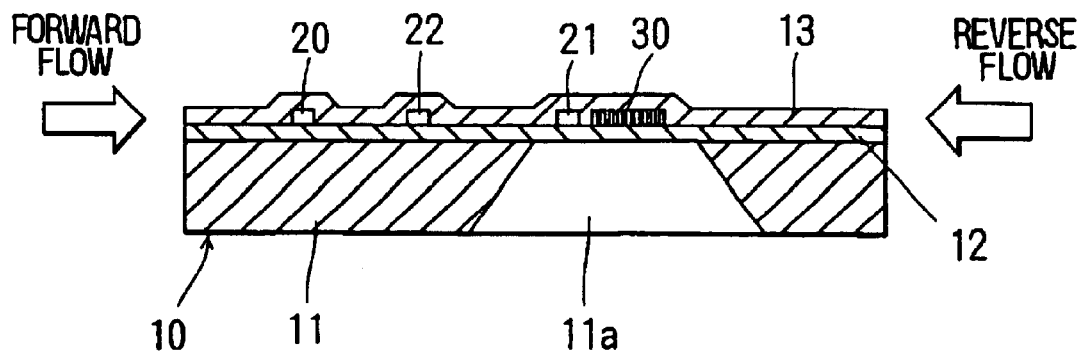
FIG. 12B is a sectional view of the flow amount measuring apparatus along line XIIB—XIIB in FIG. 12A.
Figure 13:
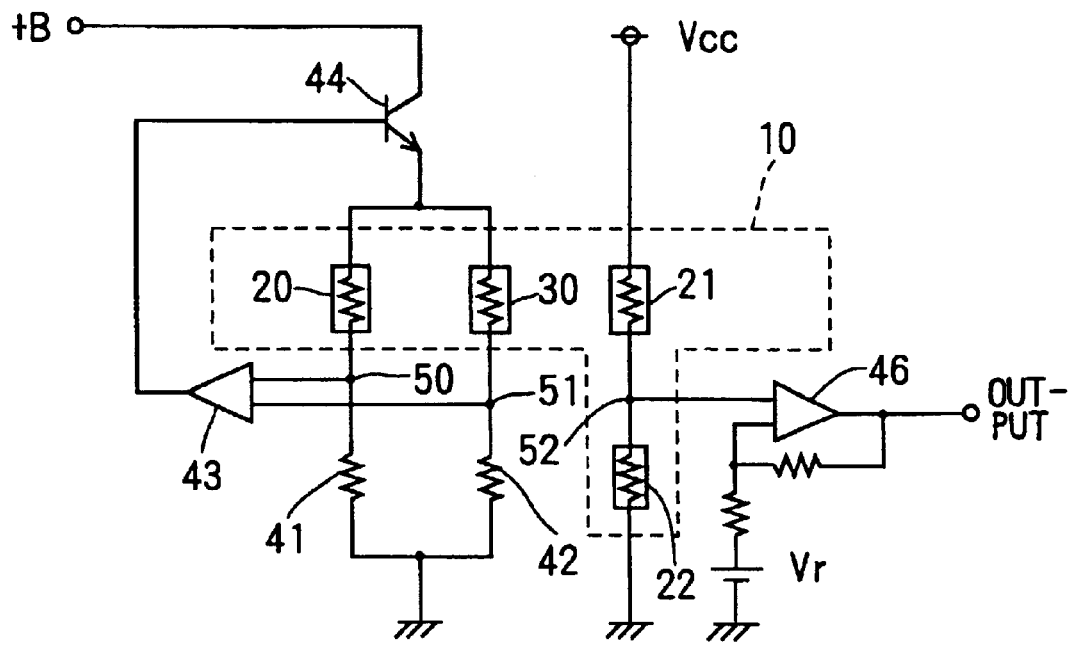
FIG. 13 is a circuit diagram showing an equivalent circuit of the flow amount measuring apparatus according to the sixth embodiment.

In a sixth embodiment shown in FIGS. 12A, 12B and 13, the intake air temperature detectors 20 and 22 are disposed at locations where the heat of the heater 30 does not influence the intake air temperature detecting operations. The control circuit is constructed as shown in FIG. 13 so that the temperatures, that is, resistances, of the flow amount detector 21 and the intake air temperature detector 22 function as the fluid temperature detector. The potential at the junction 52 between the intake air temperature detector 22 and the fluid amount detector 21 which changes its temperature in response to changes in the intake air temperature does not change. It rather changes in response to the intake air flow amount and the direction of the intake air flow which the fluid amount detector 21. Therefore, the intake air flow direction and the intake air flow amount are measured irrespective of changes in the intake air temperature by applying the potential at the junction 52 and a predetermined fixed potential to one and the other inputs of the amplifier 46, respectively.

(Seventh Embodiment)

It is considered that the circuit of the first embodiment shown in FIG. 2 is constructed to maintain the temperature of the heater 30 constant irrespective of changes in the intake air temperature. If the intake air flow amount detected by the flow amount detector 21 is not influenced by the changes in the intake air flow temperature, the intake air flow direction and the intake air flow amount are measured irrespective of the changes in the intake air temperature by maintaining the input potential applied to the other input of the amplifier 46 at a fixed potential. However, the intake air flow between the heater 30 and the flow amount detector 21 and the thermal conductivity of the semiconductor substrate 11 actually change with changes in the intake air temperature. Therefore, if the temperature of the heater 30 is set to the fixed temperature, the intake air flow amount detected solely from the temperature detected by the flow amount detector 21 is influenced by changes in the thermal conductivity caused by the intake air temperature.

Figure 14:
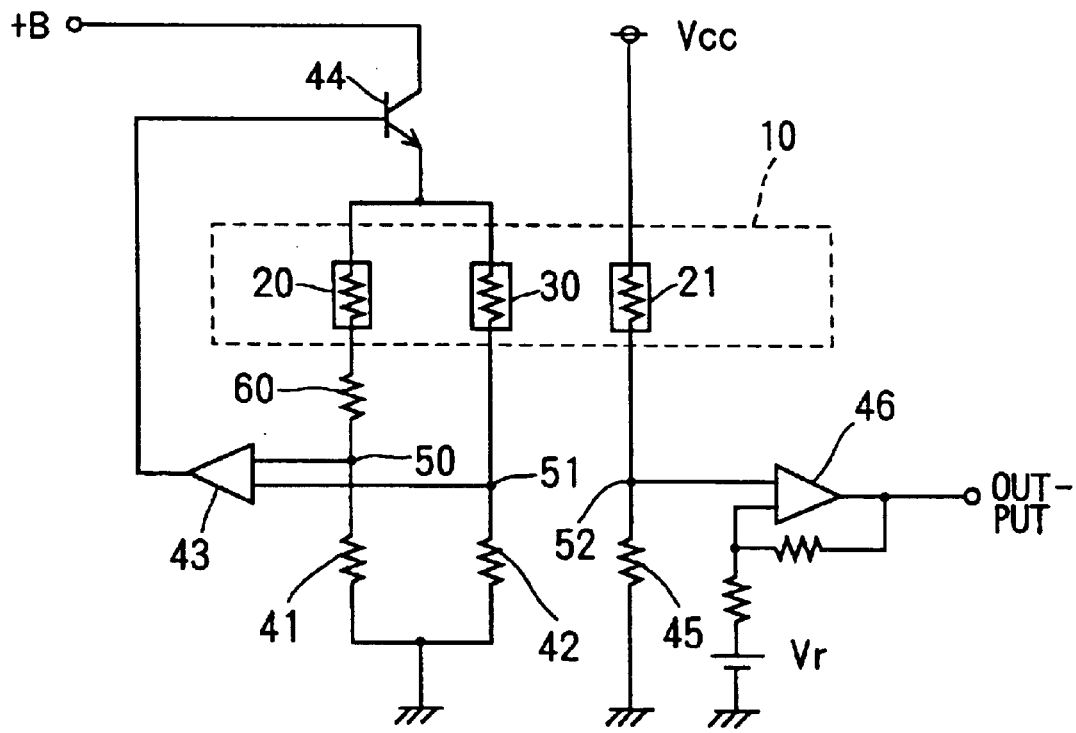
FIG. 14 is a diagram showing an equivalent circuit of the flow amount measuring apparatus according to a seventh embodiment of the present invention.

For this reason, according to a seventh embodiment shown in FIG. 14, a resistor 60 of a fixed resistance between the intake air temperature detector 20 and the junction 50. The range of temperature changes of the heater 30 caused by the temperature changes of the intake air temperature detector 20 is narrowed in the case of using the resistor 60 than in the case of not using the same. Optimizing the resistance of the resistor 60 cancels out the changes in the thermal conductivity caused by the changes in the intake air temperature between the heater 30 and the flow amount detector 21 and the changes in the temperature of the heater 30. As a result, the intake air flow amount and the intake air flow direction are measured solely from the temperature detected by the flow amount detector 21. That is, even if the other input potential of the amplifier 46 is fixed, the intake air flow amount and the intake air flow direction are measured solely from the temperature detected by the flow amount detector 21. The resistor 60 thus compensate for changes in the thermal conductivity between the heater 30 and the flow amount detector 21. The intake air flow amount and the intake air flow direction are also measured even if the resistor 60 is not used in the circuit shown in FIG. 14 by optimizing the characteristics of the resistance changes relative to the temperature of the intake air temperature detector 20.

(Eighth Embodiment)

Figure 15:
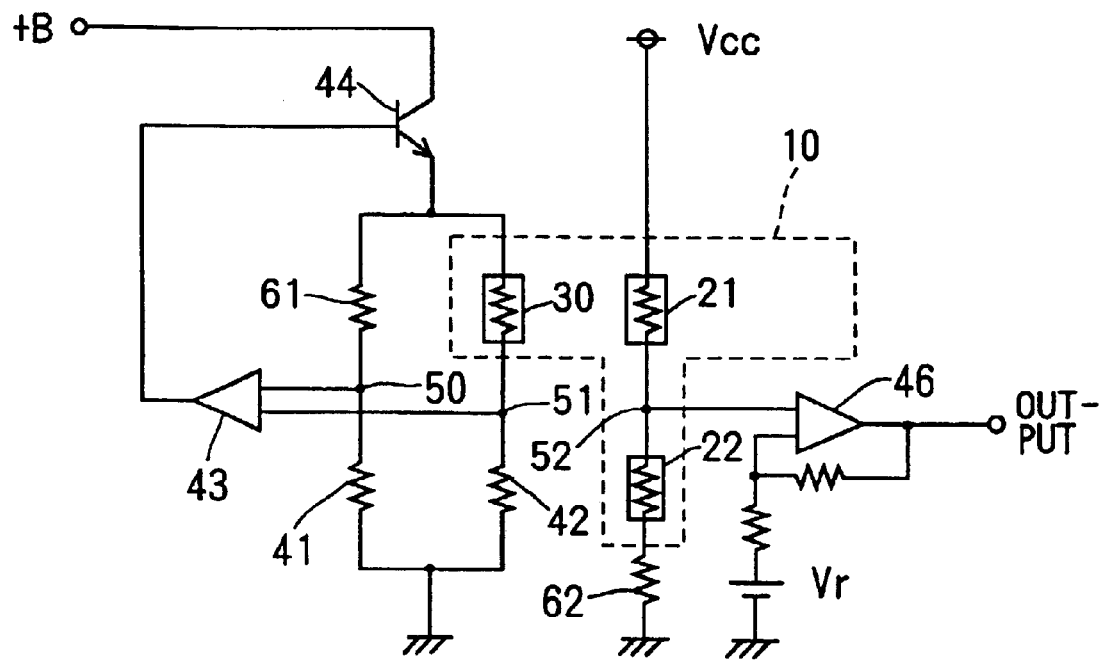
FIG. 15 is a diagram showing an equivalent circuit of a flow amount measuring apparatus according to an eighth embodiment of the present invention.

In an eighth embodiment shown in FIG. 15, the intake air temperature detector 20 in the circuit of the first embodiment shown in FIG. 2 is replaced with a resistor 61 of a fixed resistance so that the temperature of the heater 30 is set to a fixed temperature. The flow amount detector 21, the intake air temperature detector 22 and a resistor 62 of a fixed resistance are connected as shown in FIG. 15, and the potential at the junction between the flow amount detector 2 and the intake air temperature detector 22 is applied to one input of the amplifier 46. The other input potential of the amplifier 46 is fixed.

If the temperature of the heater 30 is set to the fixed temperature, the intake air flow amount detected solely from the temperature of the flow amount detector 21 changes in response to the intake air temperature because of changes in the thermal conductivity caused by the temperature of intake air flowing between the heater 30 and the flow amount detector 21. Therefore, the intake air flow amount responsive to the intake air flow direction is detected irrespective of the intake air temperature, by connecting as shown in FIG. 15 the intake air temperature detector 22 and the resistor 62 having an optimum resistance set in consideration of the changes in the thermal conductivity caused by the intake air temperature, and by applying the potential of the junction 52 and the fixed potential to one input and the other input of the amplifier 46, respectively. The intake air flow amount responsive to the intake air flow direction is measured even if the resistance 62 is removed from the circuit shown in FIG. 15 by optimally setting the characteristics of the resistance changes of the intake temperature detector 22 relative to temperature.

In the foregoing embodiments for implementing the present invention, the intake air flow amount is detected while taking into consideration the intake air flow direction by determining whether the temperature detected by the flow amount detector 21 is higher or lower than the reference temperature. However, the temperature detected by the flow amount detector 21 responds to changes in the distance between the flow amount detector 21 and the heater. For instance, if the flow amount detector 21 is distanced away from the heater, the temperature detected by the flow amount detector 21 may become lower than the reference temperature even if the flow amount detector 21 is located at the downstream side of the heater with respect to the intake air flow in the forward direction. Therefore, it is possible to compare the temperature detected by the flow amount detector 21 and a temperature different from the reference temperature but determined to variably change with the reference temperature based on the distance between the flow amount detector 21 and the heater 30.

The present invention may also be applied to a device which measures gas flow amount other than air.

What is claimed is:

1. A flow amount measuring apparatus comprising:
   a fluid temperature detector for detecting a fluid temperature;
   a heater controllable to a reference temperature which is either one of a fixed temperature and a variable temperature responsive to the fluid temperature detected by the fluid temperature detector;
   a flow amount detector disposed at only one of an upstream side and a downstream side of the heater with respect to a direction of fluid flow and changes its temperature in response to the fluid flow amount and the fluid flow direction; and
   detecting means for detecting the fluid flow amount variable with the fluid flow direction from the temperature detected by the fluid amount detector.

2. A fluid amount measuring apparatus of claim 1, wherein:
   the detecting means is for producing an output corresponding to a difference between the temperature detected by the fluid amount detector and a fixed temperature.

3. A flow amount measuring apparatus of claim 1, wherein:
   the detecting means is for producing an output corresponding to a difference between the temperature detected by the fluid amount detector and the temperature detected by the fluid temperature detector.

4. A flow amount measuring apparatus of claim 1, wherein:
   the flow amount detector is disposed upstream the heater with respect to a forward direction of a fluid flow;
   the detecting means is for producing an output varying in dependence on the fluid flow in the forward direction and in a reverse direction when the temperature detected by the flow amount detector is lower and higher than a predetermined temperature, respectively, and varying in dependence on a temperature difference between the predetermined temperature and the temperature detected by the flow amount detector.

5. A flow amount measuring apparatus of claim 1, wherein:
   the flow amount detector is disposed downstream the heater with respect to the forward direction of a fluid flow;
   the detecting means is for producing an output varying in dependence on the fluid flow in a reverse direction and in the forward direction when the temperature detected by the flow amount detector is lower and higher than a predetermined temperature, respectively, and varying in dependence on a temperature difference between the predetermined temperature and the temperature detected by the flow amount detector.

6. A flow amount measuring apparatus of claim 1, wherein:
   a temperature of the heater at one of an upstream side and a downstream side and another of the upstream side and the downstream side is lower and higher than the reference temperature, respectively.

7. A flow amount measuring apparatus of claim 1, wherein:
   the flow amount detector is disposed to be capable of detecting a temperature which is lower and higher than the reference temperature when the fluid flow is in a direction from the flow amount detector to the heater and in a direction from the heater to the flow amount detector, respectively.

8. A flow amount measuring apparatus of claim 1, wherein:
   the heater includes a strip which turns at a plurality of points to have a total width larger than that of the fluid temperature detector and the fluid amount detector in the fluid flow direction.

9. A flow amount measuring apparatus of claim 1, further comprising:
   a substrate on which the fluid temperature detector, the fluid amount detector and the heater are formed, the substrate having a cavity underneath the fluid temperature detector.

10. A flow amount measuring apparatus of claim 1, further comprising:
    a substrate on which the fluid temperature detector, the fluid amount detector and the heater are formed, the substrate having slits at the upstream side of the flow amount detector and the downstream side of the heater.

11. A flow amount measuring apparatus as in claim 1 wherein:
    said heater has a total width larger than that of the fluid temperature detector and the fluid amount detector in a fluid flow direction, and
    said flow amount detector is disposed in closer proximity to the heater than is the fluid temperature detector with respect to fluid flow direction.

12. A flow amount measuring apparatus comprising:
    a substrate;
    a heater formed on the substrate and controllable to a first reference temperature;
    a first temperature detector formed on the substrate at a position upstream of the heater;
    a second temperature detector formed on the substrate at a position close to the heater, said second temperature detector being disposed at one of the upstream and downstream sides of the heater; and
    a control circuit connected to the heater, the first temperature detector and the second temperature detector and including a heater control part and a flow amount measuring part, the first temperature detector being for detecting a first temperature and connected to at least one of the heater control part and the flow amount measuring part, the second temperature detector being connected to the flow amount measuring part, and the flow amount measuring part producing an output varying with a difference between a second temperature detected by the second temperature detector and a second reference temperature and with a flow direction of fluid passing along the substrate;

wherein the first temperature detector is connected to the heater control part so that the first reference temperature of the heater is controlled to vary with the first temperature detected by the first temperature sensor; and the second reference temperature is fixed.

13. A flow amount measuring apparatus of claim 12, wherein:
the heater has a width in a direction of fluid flow which is larger than that of the second temperature detector.

14. A flow amount measuring apparatus of claim 12, wherein:
the substrate has cavities at locations underneath the first temperature detector, the heater and the second temperature detector.

15. A flow amount measuring apparatus of claim 12, wherein:
the substrate has a slit formed between the second temperature detector and the heater.

16. A flow amount measuring apparatus as in claim 12 wherein:
said heater has a total width larger than that of the fluid temperature detector and the fluid amount detector in a fluid flow direction, and
said flow amount detector is disposed in closer proximity to the heater than is the fluid temperature detector with respect to fluid flow direction.

17. A flow amount measuring apparatus comprising:
a substrate;
a heater formed on the substrate and controllable to a first reference temperature;
a first temperature detector formed on the substrate at a position upstream of the heater;
a second temperature detector formed on the substrate at a position close to the heater, said second temperature detector being disposed at one of the upstream and downstream sides of the heater; and
a control circuit connected to the heater, the first temperature detector and the second temperature detector and including a heater control part and a flow amount measuring part, the first temperature detector being for detecting a first temperature and connected to at least one of the heater control part and the flow amount measuring part, the second temperature detector being connected to the flow amount measuring part, and the flow amount measuring part producing an output varying with a difference between a second temperature detected by the second temperature detector and a second reference temperature and with a flow direction of fluid passing along the substrate;
wherein the first temperature detector is connected to the second temperature detector so that the second temperature detected by the second temperature detector is corrected by the first temperature detected by the first temperature detector.

18. A flow amount measuring apparatus of claim 17, wherein:
the heater has a width in a direction of fluid flow which is larger than that of the second temperature detector.

19. A flow amount measuring apparatus of claim 17, wherein:
the substrate has cavities at locations underneath the first temperature detector, the heater and the second temperature detector.

20. A flow amount measuring apparatus of claim 17, wherein:
the substrate has a slit formed between the second temperature detector and the heater.

21. A flow amount measuring apparatus as in claim 17 wherein:
said heater has a total width larger than that of the fluid temperature detector and the fluid amount detector in a fluid flow direction, and
said flow amount detector is disposed in closer proximity to the heater than is the fluid temperature detector with respect to fluid flow direction.

22. A fluid flow amount and direction measuring apparatus comprising:
a flowing fluid temperature detector disposed in a fluid flow passage;
a controllable heater also disposed in said fluid flow passage;
a fluid flow detector disposed at only one of an upstream side and downstream side of said controllable heater and providing a temperature dependent resistance that is a predetermined function of both fluid flow amount and fluid flow direction.

23. A fluid flow amount and direction measuring apparatus as in claim 22 further comprising:
means for producing an output signal corresponding to the difference between the temperature of said fluid flow detector and a fixed temperature.

24. A fluid flow amount and direction measuring apparatus as in claim 22 further comprising:
means for producing an output signal corresponding to the difference between the temperature of said fluid flow detector and the detected flowing fluid temperature.

25. A fluid flow amount and direction measuring apparatus as in claim 22 wherein the fluid flow detector is disposed upstream of the heater with respect to a forward direction of fluid flow and further comprising:
output means is for producing an output signal varying in a dependence on fluid flow in a forward direction and in a reverse direction when the temperature detected by the fluid flow detector is lower and higher than a predetermined temperature, respectively, and varying in dependence on temperature difference between the predetermined temperature and a temperature detected by the fluid flow detector.

26. A fluid flow amount and direction measuring apparatus as in claim 22 wherein the fluid flow detector is disposed downstream of the heater with respect to a forward direction of fluid flow; and further comprising:
output means for producing an output signal varying in dependence on fluid flow in a reverse direction and in a forward direction when the temperature detected by the fluid flow detector is lower and higher than a predetermined temperature, respectively, and varying in dependence on a temperature difference between the predetermined temperature and a temperature detected by the fluid flow detector.

27. A fluid flow amount and direction measuring apparatus as in claim 22 wherein:
the heater temperature at one upstream/downstream side and the other downstream/upstream side is lower/higher than the reference temperature, respectively.

28. A fluid flow amount and direction measuring apparatus as in claim 22 wherein:
the flow detector is disposed to detect a temperature which is (a) lower and (b) higher than the reference temperature when the fluid flow is (a) in a direction from the flow amount detector to the heater and (b) in a direction from the heater to the flow amount detector, respectively.

29. A fluid flow amount and direction measuring apparatus as in claim 22 wherein:
the heater includes a strip which turns at a plurality of points to have a total width larger than that of the fluid temperature detector and the fluid flow detector in a fluid flow direction.

30. A fluid flow amount and direction measuring apparatus as in claim 22 further comprising:
a substrate on which the fluid temperature detector, the fluid flow detector and the heater are formed, the substrate having a cavity underneath the fluid temperature detector.

31. A fluid flow amount and direction measuring apparatus as in claim 22 further comprising:
a substrate on which the fluid temperature detector, the fluid flow detector and the heater are formed, the substrate having slits at the upstream side of the flow detector and the downstream side of the heater.

32. A fluid flow amount and direction measuring apparatus comprising:
a substrate;
a controllable heater formed on the substrate;
a first temperature detector formed on the substrate at a position upstream of the heater;
a second temperature detector formed on the substrate at a position closer to the heater than the first temperature detector, said second temperature detector being disposed at one of the upstream and downstream sides of the heater; and
a control circuit connected to the heater, the first temperature detector and the second temperature detector and including a heater control part and a flow amount measuring part,
the first temperature detector being controlled to detect a first temperature and connected to at least one of the heater control part and the flow amount measuring part,
the second temperature detector being connected to the flow amount measuring part, and
the flow amount measuring part producing an output signal varying as a function of (a) the difference between a temperature detected by the second temperature detector and a reference temperature and (b) the flow direction of fluid passing along the substrate.

33. A fluid flow amount and direction measuring apparatus as in claim 32 wherein:
the first temperature detector is connected to the heater control part so that the heater is controlled to vary its temperature with the temperature detected by the first temperature sensor; and
the reference temperature is fixed.

34. A fluid flow amount and direction measuring apparatus as in claim 32 wherein:
the first temperature detector is connected to the second temperature detector so that the temperature detected by the second temperature detector is corrected by the temperature detected by the first temperature detector.

35. A fluid flow amount and direction measuring apparatus as in claim 32 wherein:
the heater has a width in a direction of fluid flow which is larger than that of the second temperature detector.

36. A fluid flow amount and direction measuring apparatus as in claim 32 wherein:
the substrate has cavities at locations and underneath the first temperature detector, the heater and the second temperature detector.

37. A fluid flow amount and direction measuring apparatus as in claim 32 wherein:
the substrate has a slit formed between the second temperature detector and the heater.

38. A fluid flow amount and direction measuring method comprising:
detecting flowing fluid temperature in a fluid flow passage;
controlling the temperature of a heater also disposed in said fluid flow passage;
detecting fluid flow at only one of an upstream location and downstream location of said controllable heater and providing a temperature dependent resistance that is a predetermined function of both fluid flow amount and fluid flow direction.

39. A fluid flow amount and direction measuring method as in claim 38 further comprising: producing an output signal corresponding to the difference between the detected temperature of said fluid flow and a fixed temperature.

40. A fluid flow amount and direction measuring method as in claim 38 further comprising:
producing an output signal corresponding to the difference between the temperature at the location of detecting fluid flow and the detected flowing fluid temperature.

41. A fluid flow amount and direction measuring method as in claim 38 wherein the fluid flow detection location is disposed upstream of the heater with respect to a forward direction of fluid flow and further comprising:
producing an output signal varying in dependence on fluid flow in a forward direction and in a reverse direction when the temperature at the location of fluid flow detection is lower and higher than a predetermined temperature, respectively, and varying in dependence on temperature difference between the predetermined temperature and a temperature detected at the location of the fluid flow detection.

42. A fluid flow amount and direction measuring method as in claim 38 wherein the fluid flow detection location is disposed downstream of the heater with respect to a forward direction of fluid flow and further comprising:
producing an output signal varying in dependence on fluid flow in a reverse direction and in a forward direction when the temperature at the location of fluid flow detection is lower and higher than a predetermined temperature, respectively, and varying in dependence on temperature difference between the predetermined temperature and a temperature detected at the location of the fluid flow detection.

43. A fluid flow amount and direction measuring method as in claim 38 wherein:
the heater temperature at one upstream/downstream side and the other downstream/upstream side is lower/higher than the reference temperature, respectively.

44. A fluid flow amount and direction measuring method as in claim 38 wherein:

the flow detection location is disposed to detect a temperature which is (a) lower and (b) higher than the reference temperature when the fluid flow is (a) in a direction from the location of flow amount detection to the heater and (b) in a direction from the heater to the location of flow amount detection, respectively.

45. A fluid flow amount and direction measuring method as in claim 38 further comprising:

using a fluid temperature detector, fluid flow detector and heater formed on a substrate having a cavity underneath the fluid temperature detector.

46. A fluid flow amount and direction measuring method as in claim 38 further comprising:

using a fluid temperature detector, fluid flow detector and heater formed on a substrate having slits at the upstream side of the flow detector and the downstream side of the heater.

47. A fluid flow amount and direction measuring method comprising:

forming a controllable heater on a substrate, forming a first temperature detector on the substrate at a position upstream of the heater;

forming a second temperature detector on the substrate at a position closer to the heater than the temperature detector, said second temperature detector being disposed at one of the upstream and downstream sides of the heater; and controlling the first temperature detector to detect a first temperature;

connecting the second temperature detector to a flow amount measuring circuit, and producing an output signal varying as a function of (a) the difference between a temperature detected by the second temperature detector and a reference temperature and (b) the flow direction of fluid passing along the substrate.

48. A fluid flow amount and direction measuring method as in claim 47 wherein:

the heater is controlled to vary its temperature with the temperature detected by the first temperature sensor; and the reference temperature is fixed.

49. A fluid flow amount and direction measuring method as in claim 47 wherein:

the temperature detected by the second temperature detector is corrected by the temperature detected by the first temperature detector.

50. A fluid flow amount and direction measuring method as in claim 47 wherein:

the substrate has cavities at locations underneath the first temperature detector, the heater and the second temperature detector.

51. A fluid flow amount and direction measuring method as in claim 47 further comprising:

forming a slit in the substrate between the second temperature detector and the heater.

* * * * *